US012314585B2

(12) United States Patent
Richter et al.

(10) Patent No.: US 12,314,585 B2
(45) Date of Patent: May 27, 2025

(54) MULTI-TENANT DEVICE READ COMMAND SERVICE BALANCING

(71) Applicant: Western Digital Technologies, Inc., San Jose, CA (US)

(72) Inventors: Elkana Richter, Tene (IL); Shay Benisty, Beer Sheva (IL); Amir Segev, Meiter (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/218,870

(22) Filed: Jul. 6, 2023

(65) Prior Publication Data

US 2024/0402927 A1 Dec. 5, 2024

Related U.S. Application Data

(60) Provisional application No. 63/471,018, filed on Jun. 5, 2023.

(51) Int. Cl.
*G06F 3/06* (2006.01)

(52) U.S. Cl.
CPC .......... *G06F 3/0635* (2013.01); *G06F 3/0614* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| 10,025,531 | B2 | 7/2018 | Yoon et al. |
| 10,042,563 | B2 | 8/2018 | Nanduri et al. |
| 10,310,764 | B2 | 6/2019 | Suzuki et al. |
| 10,951,488 | B2 * | 3/2021 | Wright ................ G06F 11/3433 |
| 10,997,098 | B2 * | 5/2021 | Longo ..................... G06F 3/067 |
| 11,263,089 | B2 | 3/2022 | Ugale et al. |
| 11,379,151 | B2 | 7/2022 | Saxena et al. |
| 2009/0172499 | A1 * | 7/2009 | Olbrich ................ G06F 3/0604 |
| | | | 714/773 |

(Continued)

OTHER PUBLICATIONS

International Search Report and Written Opinion for Application No. PCT/US2024/011130 dated May 10, 2024.

*Primary Examiner* — Edward J Dudek, Jr.
*Assistant Examiner* — Ralph A Verderamo, III
(74) *Attorney, Agent, or Firm* — PATTERSON + SHERIDAN, LLP (57) ABSTRACT

In order to ensure that a bandwidth allocated to each tenant of a plurality of tenants of a data storage device is maintained, a controller of the data storage device may split a large read command, received from a host device, into a plurality of chunks, where each chunk corresponds to a distinct portion of the split large read command. Because the allocated bandwidth for a tenant is static, one or more chunks of the plurality of chunks, up to the allocated bandwidth, are executed, such that the bandwidth required to perform the one or more chunks does not exceed the allocated bandwidth for the particular tenant. Split information is added to the plurality of chunks in order to maintain coherency when executing the one or more chunks. Therefore, the agreed-upon allocated bandwidth for each tenant is maintained while performing large read commands requiring more bandwidth than allocated.

20 Claims, 6 Drawing Sheets

(56) References Cited

U.S. PATENT DOCUMENTS

| | | | |
|---|---|---|---|
| 2012/0260020 | A1 | 10/2012 | Suryabudi et al. |
| 2014/0176586 | A1* | 6/2014 | Gruber ................ G06F 12/0607 |
| | | | 345/533 |
| 2016/0179404 | A1* | 6/2016 | Nanduri ................ G06F 3/0613 |
| | | | 711/103 |
| 2019/0146684 | A1 | 5/2019 | Benisty et al. |
| 2020/0089537 | A1* | 3/2020 | Bahirat ................... G06F 9/468 |
| 2020/0167098 | A1* | 5/2020 | Shah ..................... G06F 3/0644 |
| 2021/0365193 | A1 | 11/2021 | Hong et al. |
| 2021/0365209 | A1* | 11/2021 | L'Ecuyer .............. G06F 3/0613 |
| 2022/0100567 | A1* | 3/2022 | Krishnan ................... G06T 1/60 |
| 2022/0156001 | A1* | 5/2022 | Anandan ............. G06F 9/45545 |
| 2023/0004392 | A1* | 1/2023 | Haramaty .............. G06F 12/023 |
| 2024/0028400 | A1* | 1/2024 | Mora Porta .......... G06F 13/1663 |
| 2024/0220112 | A1* | 7/2024 | Gangadhar ............. G06F 3/061 |
| 2024/0357565 | A1* | 10/2024 | Ishii ...................... H04W 72/23 |
| 2024/0393953 | A1* | 11/2024 | Qi ........................... G06F 3/061 |

* cited by examiner

MULTI-TENANT DEVICE READ COMMAND SERVICE BALANCING

CROSS-REFERENCE TO RELATED APPLICATIONS

This application claims benefit of U.S. Provisional Patent Application Ser. No. 63/471,018, filed Jun. 5, 2023, which is herein incorporated by reference.

BACKGROUND OF THE DISCLOSURE

Field of the Disclosure

Embodiments of the present disclosure generally relate to data storage devices, such as solid state drives (SSDs), and, more specifically, improving quality of service (QOS) in multi-tenant data storage devices.

Description of the Related Art

Non-volatile memory (NVM) express (NVMe) is a scalable host controller interface designed to address the needs of Enterprise and Client systems that utilize peripheral component interconnect (PCI) express (PCIe)-based solid state drives (SSDs). One of the requirements for NVMe systems is quality of service (QOS). Because the NVMe SSD may be a multi-tenant NVMe SSD, the QoS for each tenant needs to be ensured. In the multi-tenant NVMe SSD, the QoS may partially be translated to the response time for a specific tenant's command. Once a tenant sends a command to the multi-tenant NVMe SSD, the response time to complete the command may relate to the QoS of the multi-tenant NVMe SSD.

When a tenant sends a large read command, the large read command may monopolize the available bandwidth of the multi-tenant NVMe SSD and cause performing other read commands sent by other tenants to be delayed. In other words, each new read command from the tenant or other tenants may be serviced until the executing the large read command is completed. The delay in time for the following read commands results in an impact on the QoS of the storage system and the multi-tenant NVMe SSD.

Thus, there is a need in the art for an improved sharing of the bandwidth while servicing read commands from a plurality of tenants.

SUMMARY OF THE DISCLOSURE

The present disclosure generally relates to data storage devices, such as solid state drives (SSDs), and, more specifically, improving quality of service (QOS) in multi-tenant data storage devices. In order to ensure that a bandwidth allocated to each tenant of a plurality of tenants of a data storage device is maintained, a controller of the data storage device may split a large read command, received from a host device, into a plurality of chunks, where each chunk corresponds to a distinct portion of the split large read command. Because the allocated bandwidth for a tenant is static, one or more chunks of the plurality of chunks, up to the allocated bandwidth, are executed, such that the bandwidth required to perform the one or more chunks does not exceed the allocated bandwidth for the particular tenant. Split information is added to the plurality of chunks in order to maintain coherency when executing the one or more chunks. Therefore, the agreed-upon allocated bandwidth for each tenant is maintained while performing large read commands requiring more bandwidth than allocated.

In one embodiment, a data storage device includes a memory device and a controller coupled to the memory device. The controller is configured to receive a read command from a first tenant of a plurality of tenants, where each tenant, per timeslot, is allocated a number of flash read units (FRUs) from a total number of FRUs for the timeslot, and where each allocated amount of FRUs is distinct from each other, determine that the received read command is greater than the amount of FRUs of the first tenant, split the received read command into a plurality of chunks, where each chunk is a generated read command, execute a first number of chunks of the plurality of chunks during a first timeslot, and execute a second number of chunks of the plurality of chunks during a second timeslot, where the second number of chunks are distinct from the first number of chunks.

In another embodiment, a data storage device includes a memory device and a controller coupled to the memory device. The controller includes a read commands splitter module and one or more system queues coupled to the read commands splitter module. The read commands splitter module is configured to receive a read command associated with a tenant of a plurality of tenants, determine whether a size of the read command is greater than a number of flash read units (FRUs) associated with the tenant of the plurality of tenants, and split the received read command into a plurality of chunks, where each chunk other than a first chunk of the plurality of chunks is a generated command. The one or more system queues are configured to receive the plurality of chunks from the read commands splitter module, where each system queue is associated with a distinct tenant of the plurality of tenants. The controller is configured to execute one or more chunks of the plurality of chunks based on the number of FRUs available for the tenant.

In another embodiment, a data storage device includes means for storing data and a controller coupled to the means for storing data. The controller is configured to receive a read command from a tenant of a plurality of tenants, split the read command, based on a maximum number of flash read units (FRUs) allocated to the tenant, into a plurality of chunks, where each chunk except for a last chunk has a size equal to an FRU, and where the last chunk has a size equal to or less than the FRU, and execute one or more chunks of the plurality of chunks based on the maximum number of FRUs allocated to the tenant.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, improving quality of service (QoS) in multi-tenant data storage devices. In order to ensure that a bandwidth allocated to each tenant of a plurality of tenants of a data storage device is maintained, a controller of the data storage device may split a large read command, received from a host device, into a plurality of chunks, where each chunk corresponds to a distinct portion of the split large read command. Because the allocated bandwidth for a tenant is static, one or more chunks of the plurality of chunks, up to the allocated bandwidth, are executed, such that the bandwidth required to perform the one or more chunks does not exceed the allocated bandwidth for the particular tenant. Split information is added to the plurality of chunks in order to maintain coherency when executing the one or more chunks. Therefore, the agreed-upon allocated bandwidth for each tenant is maintained while performing large read commands requiring more bandwidth than allocated.

Figure 1:
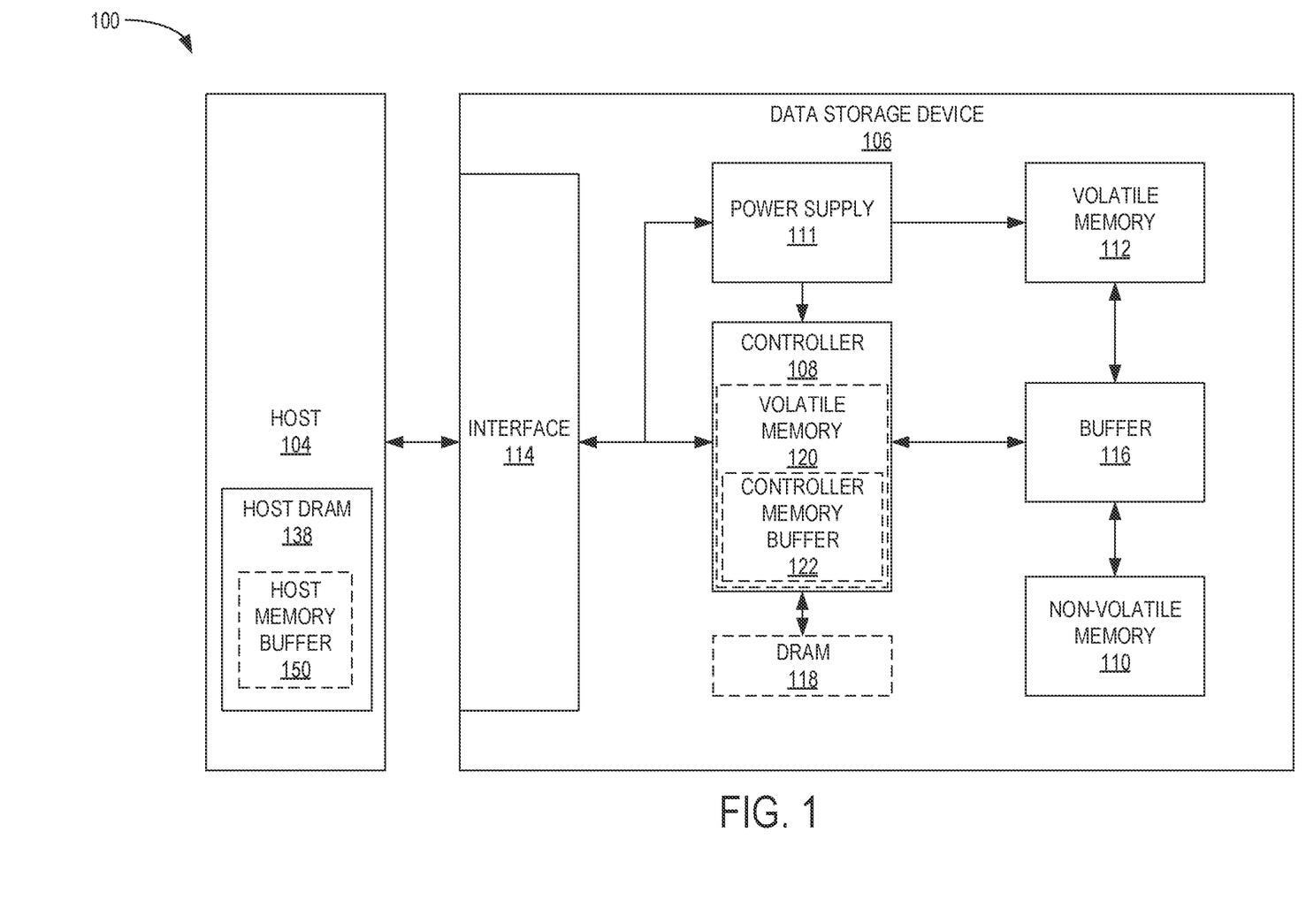
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). It is to be understood in that the listed memory architectures are not intended to be limiting, but to provide examples of possible embodiments. For example, it is contemplated that higher level cell memory may be applicable, such as penta level cell (PLC) memory and the like (e.g., 6-level cell, 7-level cell, etc.). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Figure 2:
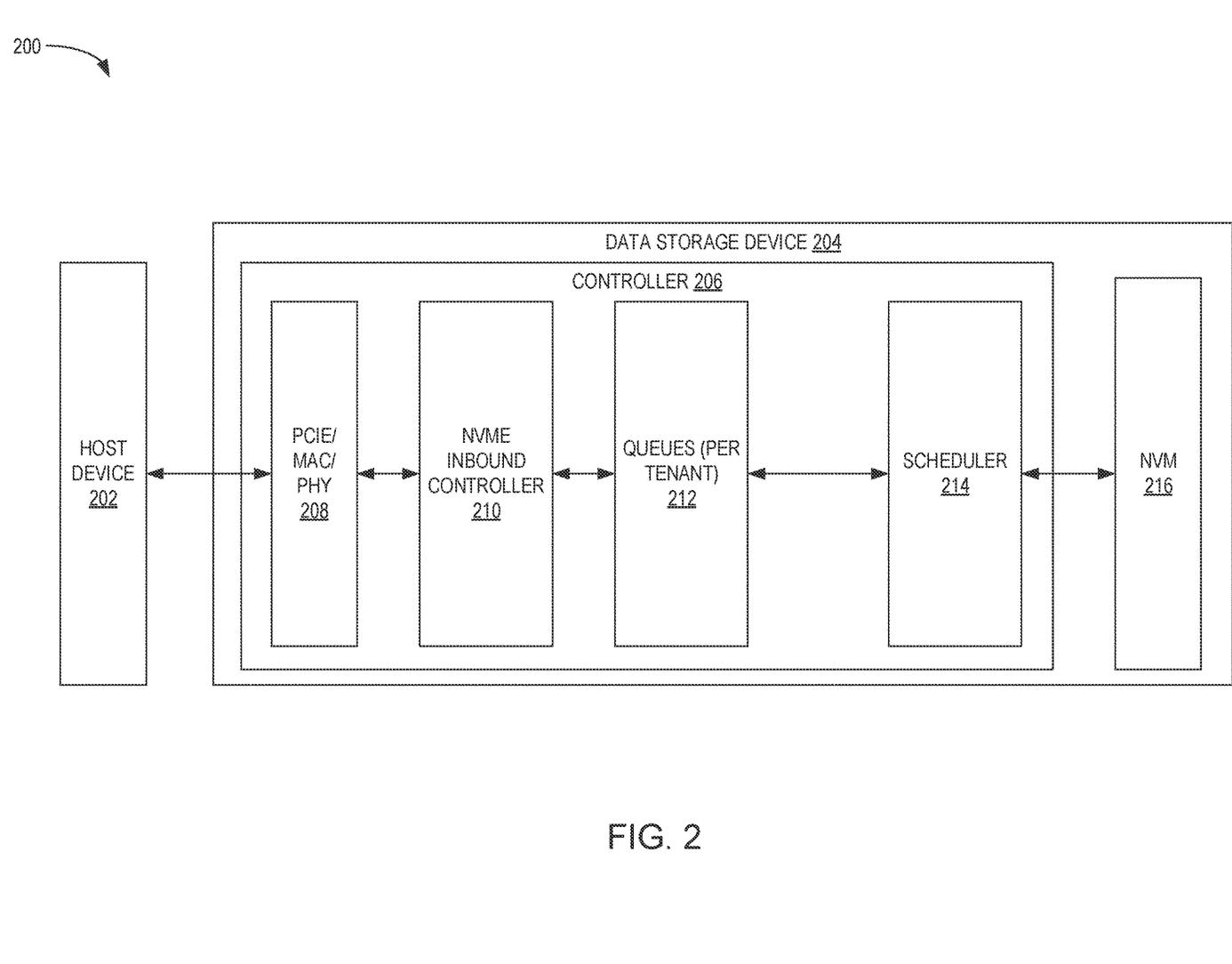
FIG. 2 is a schematic block diagram illustrating a storage system in which a data storage device may function as a storage device for a host device, according to certain embodiments.

FIG. 2 is a schematic block diagram illustrating a storage system 200 in which a data storage device 204 may function as a storage device for a host device 202, according to certain embodiments. The storage system 200 may be similar to the storage system 100 of FIG. 1. In some examples, the data storage device 204 may include additional components not shown in FIG. 2 for the sake of clarity.

The data storage device 204 includes a controller 206 and an NVM 216. The controller 206 includes a PCIe/multiplier-accumulator (MAC)/physical layer (PHY) interface 208, an NVMe inbound controller 210 coupled to the PCIe/MAC/PHY interface 208, one or more queues 212 coupled to the NVMe inbound controller 210, and a scheduler 214 coupled to the one or more queues 212. Each of the one or more queues 212 may be initiated for a corresponding tenant of one or more tenants. The host device 202 may send data and commands to the controller 206 via a tenant of a plurality of tenants. In other words, the host device 202 may initialize each tenant of the plurality of tenants. Each tenant of the plurality of tenants may be a physical function or a virtual function. For example, each of the tenants of the plurality of tenants are virtual functions. In another example, each of the tenants of the plurality of tenants are physical functions. In yet another example, the plurality of tenants includes at least one physical function and at least one virtual function. In some examples, each physical function includes one or more virtual functions, wherein each virtual function is associated with a distinct set of resources of the corresponding physical function.

The controller 206 is configured to receive read commands (and write commands) from the host device 202 via the PCIe/MAC/PHY interface 208. The NVMe inbound controller 210 may be configured to pass commands received at the PCIe/MAC/PHY interface 208 to the one or more queues 212. The scheduler 214 retrieves the commands queued in the one or more queues 212 and schedules the commands to be executed to the NVM 216. The scheduler 214 may arbitrate between the new commands placed in each input queue, effectively creating an arbitration between all of the tenants working with the data storage device 204. In other words, the scheduler 214 may retrieve and execute commands from the one or more queues 212 in a round robin order or any other applicable order. Data read from the NVM 216 as part of a read command received from one of the tenants of the host device 202 is provided back to the host device 202. While the scheduler 214 is arbitrating between the commands from the different tenants to enable some bandwidth sharing, receiving a large command from a tenant may cause a bottleneck in the data storage device 204.

Figure 3:
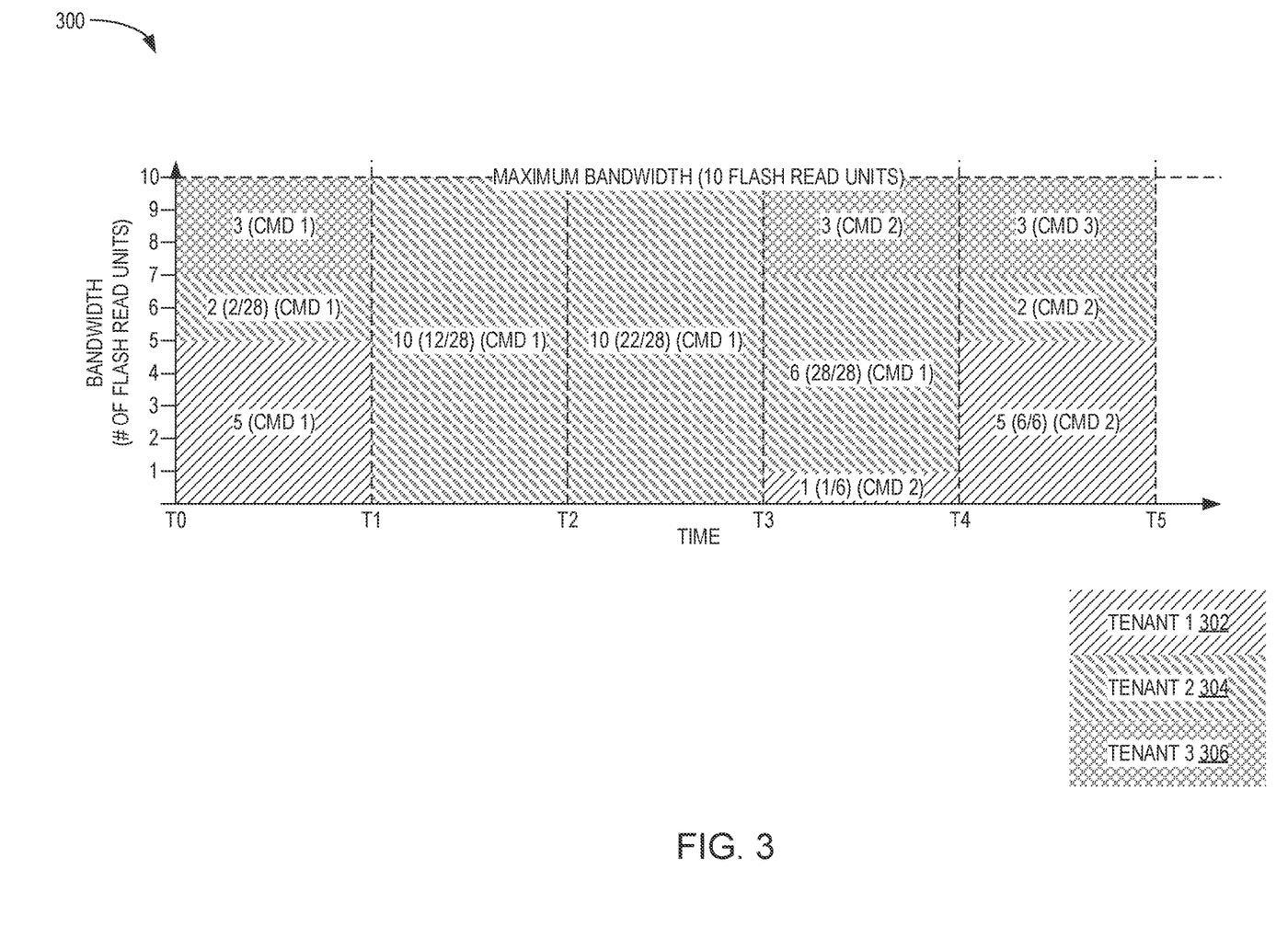
FIG. 3 is an exemplary graph of a read bandwidth of a data storage device split between a plurality of tenants, according to certain embodiments.

FIG. 3 is an exemplary graph 300 of a read bandwidth of a data storage device, such as the data storage device 204 of FIG. 2, split between a plurality of tenants 302, 304, 306, according to certain embodiments. For exemplary purposes, aspects of the storage system 200 of FIG. 2 may be referenced herein.

The read bandwidth, in the exemplary graph 300, shows a maximum bandwidth of 10 flash read units (FRUs) per timeslot, where a FRU is the size of a flash sense operation. A timeslot is a partition of time, such that from T0 to T1 is a first timeslot, T1 to T2 is a second timeslot, T2 to T3 is a third timeslot, T3 to T4 is a fourth timeslot, T4 to T5 is a fifth timeslot, and so-forth. The size of an FRU is determined by the data size of the read command from the NVM 216. The data storage device 204 may have a maximum read bandwidth that the controller 206 may allocate. The maximum read bandwidth may be less than a total possible read bandwidth of the data storage device 204. Each tenant of the plurality of tenants 302, 304, 306 is provided (i.e., allocated) a specific amount of bandwidth (in units of FRU). In the exemplary graph 300, tenant 1 302 is allocated 5 FRUs per timeslot, tenant 2 304 is allocated 2 FRUs per timeslot, and tenant 3 306 is allocated 3 FRUs per timeslot. Although each tenant of the plurality of tenants 302, 304, 306 is allocated a specific amount of bandwidth (in units of FRU), the amount of bandwidth for a certain timeslot utilized by a tenant may be greater than the allocated amount of bandwidth for that tenant.

When the scheduler 214 arbitrates between the plurality of tenants 302, 304, 306, the arbitration order of the tenants, in the exemplary graph 300, is tenant 3 306 first, tenant 1 302 second, and tenant 2 304 third. Tenant 1 302 sends 4 read commands with data length of 5 FRUs, 6 FRUs, 9 FRUs, and 5 FRUs. Tenant 2 304 sends 2 commands with data length of 28 FRUs and 2 FRUs. Tenant 3 306 sends 5 read commands, where each of the 5 read commands has a data length of 3 FRUs.

The first selected tenant in the first timeslot (i.e., T0 to T1) is tenant 3 306, where the first command of tenant 3 306 having 3 FRUs is added to the system execution. The second selected tenant in the first timeslot (i.e., T0 to T1) is tenant 1 302, where the first command of tenant 1 302 having 5 FRUs is added to the system execution. The third selected tenant in the first timeslot (i.e., T0 to T1) is tenant 2 304, where the first command of tenant 2 having 28 FRUs is added to the system execution. However, because the amount of available bandwidth is 2 FRUs, only 2 FRUs of the 28 FRUs is added to the first timeslot (i.e., T0 to T1) for system execution and the remaining 26 FRUs is handled in the subsequent timeslots. In other words, the remaining 26 FRUs of the first read command of tenant 2 304 are prioritized over the subsequent read commands of tenant 1 302 and tenant 3 306.

In the second timeslot (i.e. T1 to T2), the entire read bandwidth is utilized by tenant 2 304, where 10 FRUs of the remaining 26 FRUs of the command having 28 FRUs are added to the system execution. Likewise, in the third timeslot (i.e. T2 to T3), the entire read bandwidth is utilized by tenant 2 304, where 10 FRUs of the remaining 16 FRUs of the command having 28 FRUs are added to the system execution. In other words, commands from the other tenants (i.e., tenant 1 302 and tenant 3 306) are not serviced during the second timeslot and the third timeslot since the remaining 26 FRUs from the first command of tenant 304 are prioritized to be finished prior to starting to complete new read commands from the other tenants (i.e., tenant 1 302 and tenant 3 306). Thus, a bottleneck occurs due to tenant 2 304 utilizing the entire read bandwidth of the data storage device 204. In other words, partially completed read commands for a tenant are prioritized over starting new read commands for other tenants.

At timeslot 4 (i.e., T3 to T4), commands of the other tenants (i.e., tenant 1 302 and tenant 3 306) are able to be executed since the remaining amount of bandwidth needed to complete the 28 FRU command from tenant 2 304 is 6 FRUs. Thus, 6 FRUs of bandwidth are utilized by the tenant 2 304. The next amount of bandwidth is allocated to tenant 3 306, where tenant 3 306 utilizes 3 FRUs of bandwidth to execute the second read command queued. Because only 1 FRU of bandwidth is left available at timeslot 4 (i.e., T3 to T4), only 1 FRU of the second read command having 6 FRUs of tenant 1 302 is able to be serviced. At timeslot 5 (i.e., T4 to T5), the remaining 5 FRUs of the second read command of tenant 1 302 is executed. Next, the second command having 2 FRUs of tenant 2 304 and the third command having 3 FRUs of the tenant 3 306 are executed.

Figure 4:
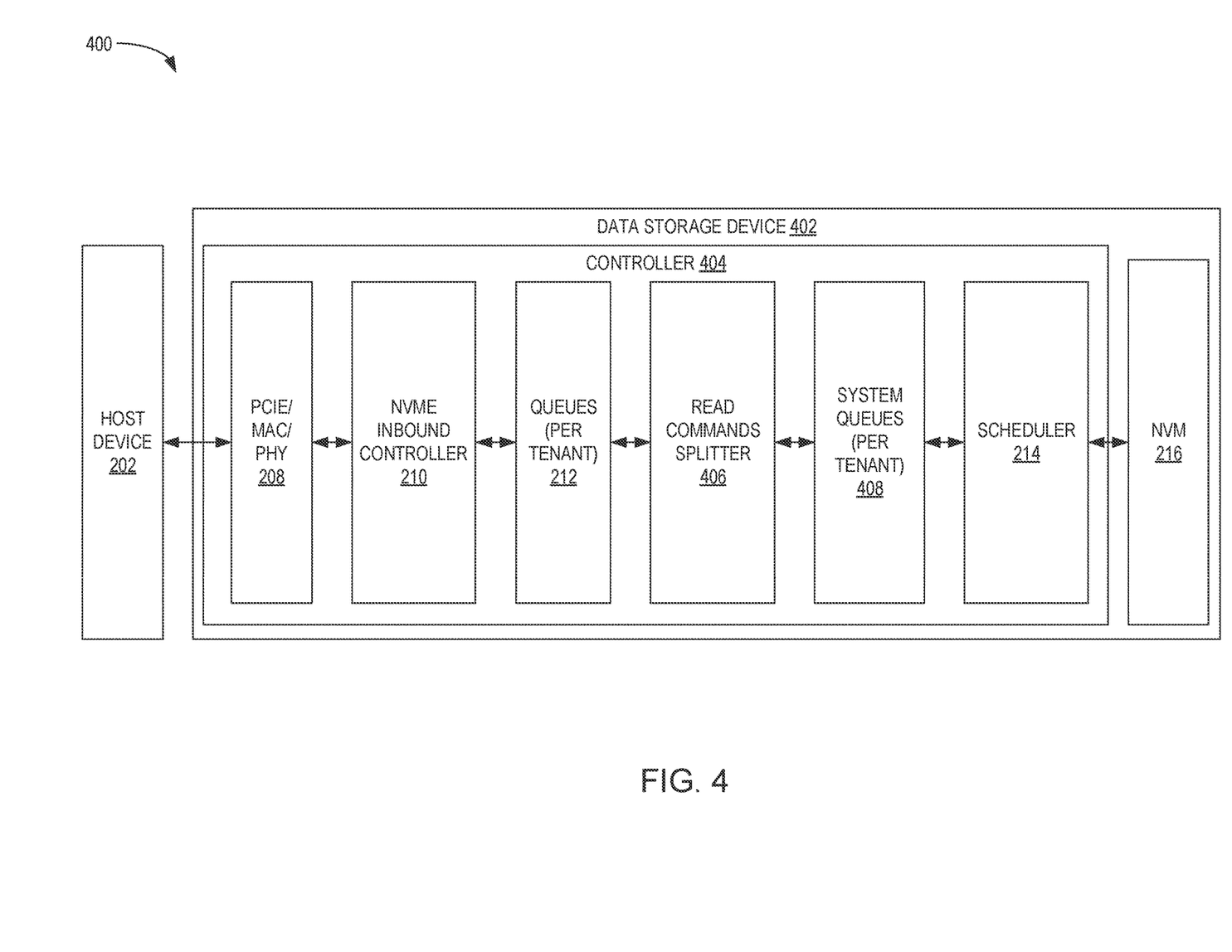
FIG. 4 is a schematic block diagram illustrating a storage system in which a data storage device may function as a storage device for a host device, according to certain embodiments.

FIG. 4 is a schematic block diagram illustrating a storage system 400 in which a data storage device 402 may function as a storage device for a host device, according to certain embodiments. The storage system 400 may be similar to the storage system 200 of FIG. 2. For simplification purposes, similar elements in both the storage system 400 and the storage system 200 of FIG. 2 are referenced using the same reference numeral. In some examples, the data storage device 402 may include additional components not shown in FIG. 4 for the sake of clarity.

The data storage device 402 includes a controller 404 and an NVM 216. The controller 404 includes a PCIe/MAC/PHY interface 208, an NVMe inbound controller 210 coupled to the PCIe/MAC/PHY interface 208, one or more queues 212 coupled to the NVMe inbound controller 210, a read commands splitter 406 coupled to the one or more queues 212, one or more system queues 408 coupled to the read commands splitter 406, and a scheduler 214 coupled to the one or more system queues 408. Each of the one or more queues 212 may be initiated for a corresponding tenant of one or more tenants. Likewise, each of the one or more system queues 408 are associated with a corresponding tenant of one or more tenants.

The host device 202 may send data and commands to the controller 404 via a tenant of a plurality of tenants. In other words, the host device 202 may initialize each tenant of the plurality of tenants. Each tenant of the plurality of tenants may be a physical function or a virtual function. For example, each of the tenants of the plurality of tenants are virtual functions. In another example, each of the tenants of the plurality of tenants are physical functions. In yet another example, the plurality of tenants includes at least one physical function and at least one virtual function. In some examples, each physical function includes one or more virtual functions, wherein each virtual function is associated with a distinct set of resources of the corresponding physical function.

The controller 404 is configured to receive read commands (and write commands) from the host device 202 via the PCIe/MAC/PHY interface 208. The NVMe inbound controller 210 may be configured to pass commands received at the PCIe/MAC/PHY interface 208 to the one or more queues 212. The read commands splitter 406 is configured to retrieve a read command from a queue of the one or more queues 212 and determine whether the retrieved read command has a size greater than the a threshold size corresponding to the tenant associated with the retrieved read command. For example, the threshold size may be a multiple of an FRU. In another example, the threshold size may be the size of the bandwidth (i.e., the number of FRUs) allocated for the relevant tenant. In yet another example, the threshold size may be the size of an FRU.

When the size of the read command is greater than the threshold size for the corresponding tenant, the read commands splitter 406 splits the read command into a plurality of chunks (i.e., a plurality of smaller read commands), where each of the plurality of chunks corresponds with a distinct portion of the read command. The read commands splitter 406 is further configured to add split information to each chunk of the plurality of chunks. For example, a bit may be added to each chunk of the plurality of chunks to indicate a sequence number of the chunk, where the bit or bits are added to a corresponding field for the relevant split information. For example, a first chunk may have the sequence number of 0 to indicate that the first chunk is the head of the read command. Furthermore, a bit may be added to the first chunk to indicate that the first chunk is first command in the sequence. Likewise, a bit may be added to a last chunk of the plurality of chunks to indicate that the last chunk is a last command in the sequence. The read commands splitter 406 may also add a bit to each chunk of the plurality of chunks to indicate whether the command corresponding to the respective chunk is an original command or a new command. For example, new commands may be commands generated from the read command split while an original command is a first chunk of the plurality of chunks. After splitting a read command into a plurality of chunks, the read commands splitter 406 sends the plurality of chunks to a relevant system queue of the one or more system queues 408 to be queued to be executed. Furthermore, the size of the split chunks may be based on the geometry of the NAND (e.g., the NVM 216), such as the page size and the number of pages of the NAND. It is to be understood that the abovementioned "bit" may be one or more bits stored in a field corresponding to the split information. For example, one field may refer to the sequence number of the chunk. Another field may refer to whether the chunk is an original command or a new command The scheduler 214 retrieves one or more chunks queued in the one or more system queues 408 and schedules the commands to be executed to the NVM 216. The scheduler 214 retrieves the one or more chunks for each tenant based on a maximum allocated bandwidth for each tenant. For example, if a first tenant is allocated a maximum bandwidth of 5 FRUs, then the scheduler 214 retrieves, from the corresponding system queue of the one or more system queues 408, a number of the one or more chunks having a size of 5 FRUs (or less). Thus, the maximum bandwidth for each tenant is not exceeded and the agreed-upon bandwidth allocation for each tenant is met regardless of the read command data length. Therefore, the read command completion per tenant is constant. When the controller 404 receives the corresponding data for each of the one or more chunks executed, the controller 404 is configured to re-order the data to match the original read command sent by a tenant. The controller 404 may perform the re-ordering based on the sequence number bit added to each chunk of the plurality of chunks by the read commands splitter 406.

Figure 5:
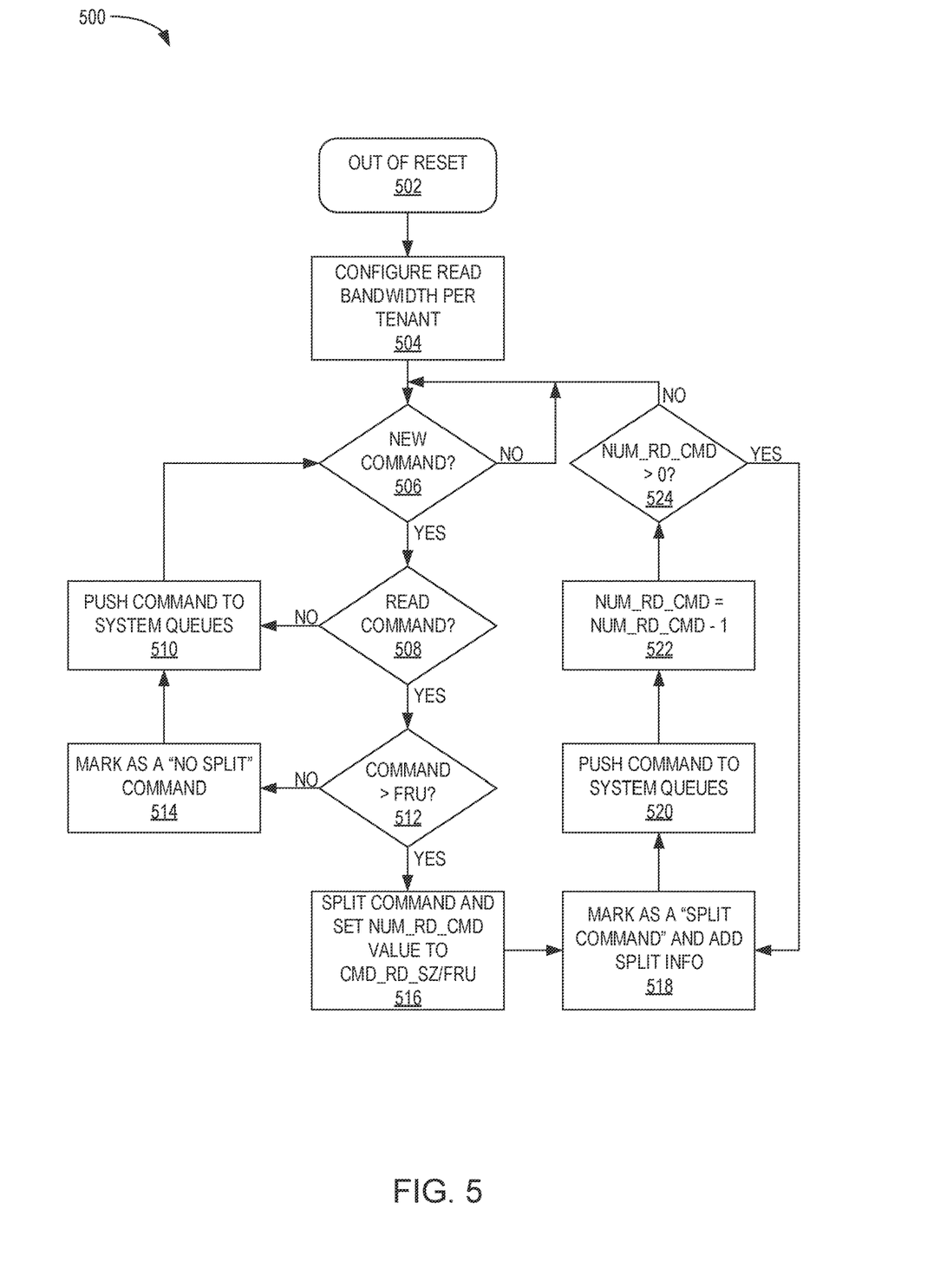
FIG. 5 is a flow diagram illustrating a method of splitting a read command of a tenant having a size greater than a number of flash read units (FRUs) allocated for the tenant, according to certain embodiments.

FIG. 5 is a flow diagram illustrating a method 500 of splitting a read command of a tenant having a size greater than a number of flash read units (FRUs) allocated for the tenant, according to certain embodiments. Method 500 may be implemented by a controller, such as the controller 404 of FIG. 4. For exemplary purposes, aspects of the storage system 400 may be referenced herein.

At block 502, the data storage device 402 is out of a reset mode. For example, the data storage device 402 may be woken up from a low power mode, powered on from an unpowered mode, or the like. At block 504, the controller 404 configures the read command bandwidth for each of the plurality of tenants of the host device 202, where the tenant is allocated a specific amount of bandwidth (i.e., a number of FRUs) from a maximum bandwidth that can be allocated. At block 506, the controller 404 determines if a new command has been received from one of the plurality of tenants. If a new command has not been received from one of the plurality of tenants, method 500 waits at block 506 until a new command received at block 506. However, if a new command has been received from one of the plurality of tenants at block 506, then the controller 404 determines if the received command is a read command at block 508.

If the received command is not a read command at block 508, then the command (e.g., a write command, an erase command, and the like) is pushed to the relevant system queue of the one or more system queues 408 to be executed at block 510. However, if the received command is a read command at block 508, then the read commands splitter 406 determines if the read command has a size greater than the threshold size (e.g., the size of an FRU) at block 512. If the read command has a size less than or equal to the FRU at block 512, then the read command is marked as a "no split" command at block 514 and pushed to the relevant system queue of the one or more system queues 408 to be executed at block 510.

However, if the read command has a size greater than the FRU at block 512, then the read commands splitter 406 splits the read command (i.e., generates a smaller command) into a chunk of a plurality of chunks and sets a number read command (NUM_RD_CMD) value equal to command read size (CMD_RD_SZ)/FRU for the chunk at block 516, where the NUM_RD_CMD value corresponds with a sequence number of the relevant chunk in relation to a number of split read commands (i.e., the number of chunks) and CMD_RD_SZ corresponds with the size of the read command.

At block 518, the read commands splitter 406 marks the chunk with "split command" and adds split information. The split information may include a bit added to each chunk of the plurality of chunks to indicate a sequence number of the chunk, a bit added to the first chunk to indicate that the first chunk is first command in the sequence, a bit added to a last chunk of the plurality of chunks to indicate that the last chunk is a last command in the sequence, and a bit added to each chunk of the plurality of chunks to indicate whether the command is an original command or a new command. When the threshold size is equal to the size of the FRU, each chunk of the plurality of chunks other than a last chunk has a size equal to the FRU and the last chunk has a size either equal to the FRU or a size less than the FRU.

At block 520, the read commands splitter 406 pushes the split command (i.e., the plurality of chunks) to the relevant system queue of the one or more system queues 408 to be executed at block 520. Each time a chunk is processed and executed by the scheduler 214, the NUM_RD_CMD value decreases by 1 at block 522. At block 524, the controller 404 determines whether the NUM_RD_CMD value is greater than 0. If the NUM_RD_CMD value is greater than 0 at block 524, then method 500 returns to block 518. In other words, the read commands splitter 406 continues to service each chunk of the plurality of chunks by marking the chunk as a "split command" and adding split info and pushing the chunk to the relevant system queue of the plurality of system queues 408. However, if the NUM_RD_CMD value is equal to 0 at block 524, then method 500 returns to block 506.

Figure 6:
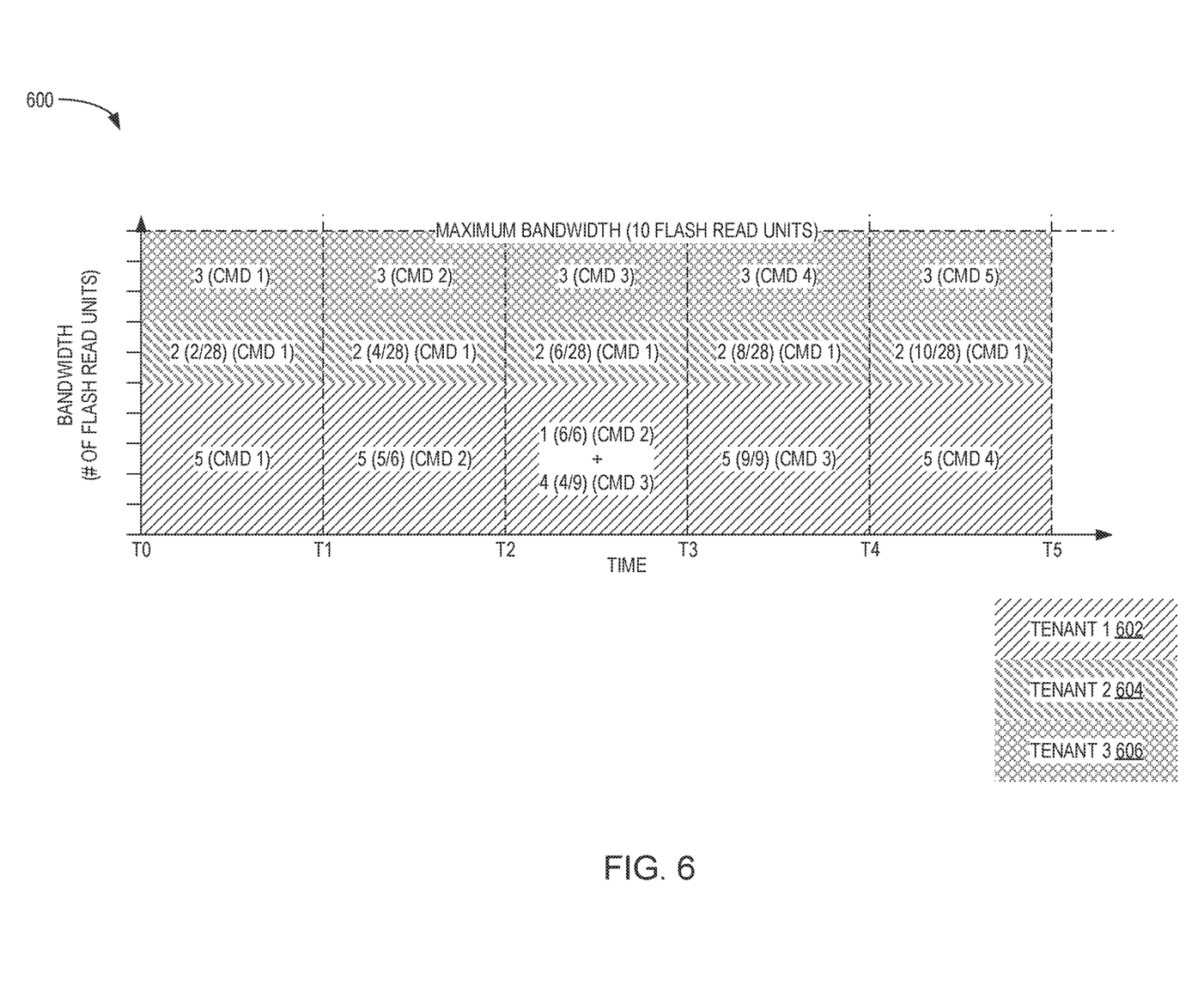
FIG. 6 is an exemplary graph of a read bandwidth of a data storage device split between a plurality of tenants based on an agreed-upon bandwidth for each tenant of the plurality of tenants, according to certain embodiments.

FIG. 6 is an exemplary graph 600 of a read bandwidth of a data storage device, such as the data storage device 402 of FIG. 4, split between a plurality of tenants based on an agreed-upon bandwidth for each tenant of the plurality of tenants, according to certain embodiments. For exemplary purposes, aspects of the storage system 400 of FIG. 4 may be referenced herein.

The read bandwidth, in the exemplary graph 600, shows a maximum bandwidth of 10 flash read units (FRUs) per timeslot, where a FRU is the size of a flash sense operation. A timeslot is a partition of time, such that from T0 to T1 is a first timeslot, T1 to T2 is a second timeslot, T2 to T3 is a third timeslot, T3 to T4 is a fourth timeslot, T4 to T5 is a fifth timeslot, and so-forth. The size of an FRU is determined by the data size of the read command from the NVM 216. The data storage device 402 may have a maximum read bandwidth that the controller 404 may allocate. The maximum read bandwidth may be less than a total possible read bandwidth of the data storage device 402. Each tenant of the plurality of tenants 602, 604, 606 is provided (i.e., allocated) a specific amount of bandwidth (in units of FRU). In the exemplary graph 600, tenant 1 602 is allocated 5 FRUs per timeslot, tenant 2 604 is allocated 2 FRUs per timeslot, and tenant 3 606 is allocated 3 FRUs per timeslot. Contrasting with the embodiment of shown in FIG. 3, each tenant of the plurality of tenants 602, 604, 606 is allocated a specific amount of bandwidth (in units of FRU) and the amount of bandwidth allocated to each tenant is maintained. The allocated amount of bandwidth for a tenant is not exceeded for a timeslot or subsequent timeslots, such that when a partially completed read command is being executed, the partially completed read command is executed based on the amount of bandwidth allocated to the respective tenant. In other words, each tenant of the plurality of tenants maintains its own bandwidth share and completes commands based on the amount of available bandwidth that has been allocated to that tenant.

As shown in the exemplary graph 600, tenant 2 604 has a read command data length of 28 FRUs. Rather than utilizing all of the available bandwidth during timeslot 2 (i.e., T1 to T2) and timeslot 3 (i.e., T2 to T3), such as shown in the exemplary graph 300, tenant 2 utilizes the maximum available bandwidth allocated for tenant 2 (i.e., 2 FRUs), where the read command is split into a plurality of chunks, each having a size of an FRU. Thus, as shown in the exemplary graph 600, each tenant has an allotted bandwidth that is not exceeded, even when the size of the read command is greater than the allotted bandwidth. Furthermore, one or more chunks associated with a plurality of commands may be executed within a same timeslot (e.g., T2 to T3) for a same tenant (e.g., tenant 1 602). As a result, each tenant maintains its agreed-upon bandwidth. Thus, read commands are completed for each tenant based on a constant completion pacing that is dependent on the bandwidth allocated for each tenant.

It is to be understood that although servicing read commands is described, the abovementioned embodiments may be applicant to be servicing write commands.

By splitting large read commands having a size greater than an allocated bandwidth for a respective tenant, bandwidth agreements between each tenant and the data storage device may be maintained, thus improving the quality of service of the data storage device.

In one embodiment, a data storage device includes a memory device and a controller coupled to the memory device. The controller is configured to receive a read command from a first tenant of a plurality of tenants, where each tenant, per timeslot, is allocated a number of flash read units (FRUs) from a total number of FRUs for the timeslot, and where each allocated amount of FRUs is distinct from each other, determine that the received read command is greater than the amount of FRUs of the first tenant, split the received read command into a plurality of chunks, where each chunk is a generated read command, execute a first number of chunks of the plurality of chunks during a first timeslot, and execute a second number of chunks of the plurality of chunks during a second timeslot, where the second number of chunks are distinct from the first number of chunks.

The controller is further configured to determine whether a workload of the data storage device is equal to or exceeds a threshold workload. The plurality of chunks has a first size when the workload of the data storage device is equal to or exceeds the threshold workload. The plurality of chunks has a second size when the workload of the data storage device is less than the threshold workload. The first size is smaller than the second size. The controller is further configured to execute a third number of chunks associated with a second received read command during the second timeslot. The second number of chunks and the third number of chunks are less than the number for FRUs allocated to the first tenant. The controller is further configured to, when splitting the received read command into the plurality of chunks, add one or more bits to a first field of each of chunk of the plurality of chunks, where the bit indicates whether the chunk is an original command or a new command. The controller is further configured to add a number of bits to a second field of the chunk indicating a sequence number, add one or more bits to a third field of a first chunk in the plurality of chunks indicating that the first chunk is first in the sequence number, and add one or more bits to a fourth field of a last chunk in the plurality of chunks indicating that the last chunk is last in the sequence number. The controller is further configured to receive a command from the first tenant and determine whether the command is the read command or a write command. The controller is further configured to determine that the received read command is less than the amount of FRUs allocated to the first tenant and push the received read command to a systems queue of the controller storing read commands to be executed. The controller is further configured to receive read data for each of the first number of chunks and for each of the second number of chunks, aggregate the received read data, and provide the received read data to the first tenant. Read commands are received and split per tenant of the plurality of tenants. Each chunk other than a last chunk of the plurality of chunks has a size equal to an FRU.

In another embodiment, a data storage device includes a memory device and a controller coupled to the memory device. The controller includes a read commands splitter module and one or more system queues coupled to the read commands splitter module. The read commands splitter module is configured to receive a read command associated with a tenant of a plurality of tenants, determine whether a size of the read command is greater than a number of flash read units (FRUs) associated with the tenant of the plurality of tenants, and split the received read command into a plurality of chunks, where each chunk other than a first chunk of the plurality of chunks is a generated command. The one or more system queues are configured to receive the plurality of chunks from the read commands splitter module, where each system queue is associated with a distinct tenant of the plurality of tenants. The controller is configured to execute one or more chunks of the plurality of chunks based on the number of FRUs available for the tenant.

At least one tenant of the plurality of tenants is a physical function. Each tenant of the plurality of tenants is either a physical function or a virtual function. The splitting is in a size of an FRU. A last chunk of the plurality of chunks has a size less than the FRU. The read commands splitter module is further configured to add one or more bits to a first field of each chunk of the plurality of chunks indicating whether the chunk is an original command or a generated command, add a number of bits to a second field of each chunk of the plurality of chunks indicating a sequence number, add one or more bits to a third field of a first chunk of the plurality of chunks indicating that the first chunk is first in the sequence number, and add one or more bits to a fourth field of a last chunk of the plurality of chunks indicating that the first chunk is last in the sequence number. The controller further includes a scheduler. The scheduler is configured to schedule the one or more chunks of the plurality of chunks to be executed based on the sequence number.

In another embodiment, a data storage device includes means for storing data and a controller coupled to the means for storing data. The controller is configured to receive a read command from a tenant of a plurality of tenants, split the read command, based on a maximum number of flash read units (FRUs) allocated to the tenant, into a plurality of chunks, where each chunk except for a last chunk has a size equal to an FRU, and where the last chunk has a size equal to or less than the FRU, and execute one or more chunks of the plurality of chunks based on the maximum number of FRUs allocated to the tenant. The read command has a size greater than the maximum number of FRUs allocated to the tenant.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
    a memory device; and
    a controller coupled to the memory device, wherein the controller is configured to:
        receive a read command from a first tenant of a plurality of tenants, wherein each tenant is allocated a number of flash read units (FRUs) from a total number of FRUs per timeslot, and wherein the allocated amount of FRUs for each tenant of the plurality of tenants is distinct;
        receive a read command from a second tenant of the plurality of tenants;
        determine that the received read command of the first tenant and the second tenant is greater than the amount of allocated FRUs of the corresponding tenant;
        split the received read command from the first tenant and the received read command from the second tenant into a plurality of chunks, wherein each chunk is a generated read command;
        execute a first number of chunks of the plurality of chunks of the first tenant and a first number of chunks of the plurality of chunks of the second tenant during a first timeslot; and
        execute a second number of chunks of the plurality of chunks of the first tenant and a second number of chunks of the plurality of chunks of the second tenant during a second timeslot, wherein the second number of chunks of each tenant are distinct from the first number of chunks of each corresponding tenant.

2. The data storage device of claim 1, wherein the controller is further configured to:
    determine whether a workload of the data storage device is equal to or exceeds a threshold workload.

3. The data storage device of claim 2, wherein:
    the plurality of chunks of the first tenant or the second tenant has a first size when the workload of the data storage device is equal to or exceeds the threshold workload;
    the plurality of chunks of the first tenant or the second tenant has a second size when the workload of the data storage device is less than the threshold workload; and
    the first size is smaller than the second size.

4. The data storage device of claim 1, wherein the controller is further configured to:
    execute a third number of chunks associated with a third received read command during the second timeslot, wherein the second number of chunks of the first tenant and the third number of chunks are less than the number for FRUs allocated to the first tenant.

5. The data storage device of claim 1, wherein the controller is further configured to, when splitting a received read command into a plurality of chunks:
    add a one or more bits to a first field of chunk of the plurality of chunks, wherein the first field indicates whether the chunk is an original command or a new command.

6. The data storage device of claim 5, wherein the controller is further configured to:
    add a number of bits to a second field of the chunk indicating a sequence number;
    add one or more bits to a third field of a first chunk in the plurality of chunks indicating that the first chunk is first in the sequence number; and
    add one or more bits to a fourth field of a last chunk in the plurality of chunks indicating that the last chunk is last in the sequence number.

7. The data storage device of claim 1, wherein the controller is further configured to:
    receive a command from the first tenant; and
    determine whether the command is the read command or a write command.

8. The data storage device of claim 1, wherein the controller is further configured to:
    determine that a received read command is less than the amount of FRUs allocated to the corresponding tenant; and
    push the received read command to a systems queue of the controller storing read commands to be executed.

9. The data storage device of claim 1, wherein the controller is further configured to:
    receive read data for each of the first number of chunks and for each of the second number of chunks of the first tenant and the second tenant;
    aggregate the received read data of the first tenant and the second tenant; and
    provide the received read data to the first tenant and the second tenant.

10. The data storage device of claim 1, wherein read commands are received and split per tenant of the plurality of tenants.

11. The data storage device of claim 1, wherein each chunk other than a last chunk of the plurality of chunks has a size equal to an FRU.

12. A data storage device, comprising:
a memory device; and
a controller coupled to the memory device, wherein the controller comprises:
   a read commands splitter module, wherein the read commands splitter module is configured to:
      receive at least one read command associated with a tenant of a plurality of tenants;
      determine whether a size of the read command is greater than a number of flash read units (FRUs) associated with the tenant of the plurality of tenants; and
      split the at least one received read command into a plurality of chunks, wherein each chunk other than a first chunk of the plurality of chunks is a generated command; and
   one or more system queues coupled to the read commands splitter module, wherein the one or more system queues are configured to:
      receive the plurality of chunks from the read command splitter module, wherein each system queue is associated with a distinct tenant of the plurality of tenants,
   wherein the controller is configured to execute, at a timeslot, one or more chunks of the plurality of chunks of two or more of tenants of the plurality of tenants based on the number of FRUs available for each tenant.

13. The data storage device of claim 12, wherein at least one tenant of the plurality of tenants is a physical function.

14. The data storage device of claim 12, wherein each tenant of the plurality of tenants is either a physical function or a virtual function.

15. The data storage device of claim 12, wherein the splitting is in a size of an FRU.

16. The data storage device of claim 15, wherein a last chunk of the plurality of chunks has a size less than the FRU.

17. The data storage device of claim 12, wherein the read command splitter module is further configured to:
   add one or more bits to a first field of each chunk of the plurality of chunks indicating whether the chunk is an original command or a generated command;
   add a number of bits to a second field of each chunk of the plurality of chunks indicating a sequence number;
   add one or more bits to a third field of a first chunk of the plurality of chunks indicating that the first chunk is first in the sequence number; and
   add one or more bits to a fourth field of a last chunk of the plurality of chunks indicating that the first chunk is last in the sequence number.

18. The data storage device of claim 17, wherein the controller further comprises a scheduler, and wherein the scheduler is configured to schedule the one or more chunks of the plurality of chunks to be executed based on the sequence number.

19. A data storage device, comprising:
means for storing data; and
a controller coupled to the means for storing data, wherein the controller is configured to:
   receive at least one read command from a tenant of a plurality of tenants;
   split the at least one received read command, based on a maximum number of flash read units (FRUs) allocated to each tenant, into a plurality of chunks, wherein each chunk except for a last chunk has a size equal to an FRU, and wherein the last chunk has a size equal to or less than the FRU; and
   execute, at a timeslot, one or more chunks of the plurality of chunks of two or more of tenants of the plurality of tenants based on the maximum number of FRUs allocated to each tenant.

20. The data storage device of claim 19, wherein the at least one read command has a size greater than the maximum number of FRUs allocated to the corresponding tenant.

* * * * *